(12) United States Patent
Owens et al.

(10) Patent No.: US 6,266,887 B1
(45) Date of Patent: Jul. 31, 2001

(54) HACKSAW AND METHOD FOR MAKING THE SAME

(75) Inventors: Robert L. Owens, Southington; Joseph T. Novak, Burlington, both of CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/371,220

(22) Filed: Aug. 10, 1999

(51) Int. Cl.⁷ .............................. B27B 21/02; B27B 21/06
(52) U.S. Cl. ............................ 30/513; 30/506; 76/112
(58) Field of Search ............................ 30/166.3, 144, 30/513, 514, 517, 506; 76/112, 119, 101.1; 83/75.5, 685

(56) References Cited

U.S. PATENT DOCUMENTS

| | | |
|---|---|---|
| 101,397 | 3/1870 | Wells . |
| D. 151,725 | 11/1948 | Whitman et al. . |
| 156,964 * | 11/1874 | Abel et al. . |
| D. 160,574 | 10/1950 | Carlson . |
| D. 204,726 | 5/1966 | David . |
| 252,570 | 1/1882 | Woodrough . |
| D. 325,506 | 4/1992 | Michas et al. . |
| 344,234 | 6/1886 | Barrick . |
| D. 370,610 | 6/1996 | Neyton . |
| 375,061 | 12/1887 | French . |
| D. 403,224 | 12/1998 | Martin et al. . |
| 653,947 | 7/1900 | Condon . |
| 679,653 | 7/1901 | Wells . |
| 979,920 | 12/1910 | Bennett . |
| 1,174,893 | 3/1916 | Page . |
| 1,245,545 | 11/1917 | Williams . |
| 1,446,674 | 2/1923 | Thompson . |
| 1,471,214 | 10/1923 | Sieben . |
| 1,636,853 | 7/1927 | Conner . |
| 1,694,150 | 12/1928 | Voss . |
| 1,713,972 | 5/1929 | Lufkin . |
| 2,137,742 | 11/1938 | Jack . |
| 2,194,494 | 3/1940 | Carroll . |
| 2,303,705 | 12/1942 | Persson . |
| 2,330,854 | 10/1943 | Wolfard . |
| 2,532,506 | 12/1950 | Mansfield . |
| 2,546,660 | 3/1951 | Wilcox . |
| 2,606,585 | 8/1952 | Collura . |
| 2,612,920 | 10/1952 | Williams . |
| 2,662,569 * | 12/1953 | Swalinkavich, Jr. . |
| 2,725,085 | 11/1955 | Doherty et al. . |
| 2,725,911 | 12/1955 | Glenn . |
| 2,771,925 | 11/1956 | Littman . |
| 2,959,203 | 11/1960 | Dreier . |
| 3,329,186 | 7/1967 | David . |
| 3,329,187 | 7/1967 | Cowley . |
| 3,636,997 | 1/1972 | Keymer . |
| 3,702,627 | 11/1972 | Dreier . |
| 3,756,298 | 9/1973 | West . |
| 3,822,731 | 7/1974 | Keymer . |
| 4,256,156 | 3/1981 | Biszantz et al. . |
| 4,328,848 | 5/1982 | Miller . |
| 4,349,059 | 9/1982 | Hepworth et al. . |
| 4,571,829 * | 2/1986 | Withers, Jr. ..................... 30/144 |
| 4,835,869 | 6/1989 | Waldherr . |

(List continued on next page.)

OTHER PUBLICATIONS

U.S. application No. 09/291,983, Martin et al., filed Apr. 15, 1999.

*Primary Examiner*—Hwei-Siu Payer
(74) *Attorney, Agent, or Firm*—Pillsbury Winthrop LLP

(57) ABSTRACT

The present invention relates to hacksaws. One aspect of the invention relates to a hacksaw with an overmolded frame member wherein the overmolded material has an I-beam configuration. Another aspect of the invention relates to an improved blade tensioning device that reduces the tension load borne by the tensioning device's mounting structure. Another aspect of the invention relates to a method for cutting metal frame members with a reduced amount of scrap.

46 Claims, 12 Drawing Sheets

U.S. PATENT DOCUMENTS

| | | |
|---|---|---|
| 5,063,675 | 11/1991 | Michas et al. . |
| 5,471,752 | 12/1995 | Koetsch . |
| 5,673,488 | 10/1997 | Grayo . |
| 5,768,788 * | 6/1998 | Arnold ................................. 30/513 |
| 5,826,344 | 10/1998 | Phelon et al. . |
| 6,079,109 * | 6/2000 | Ranieri ................................. 30/513 |

* cited by examiner

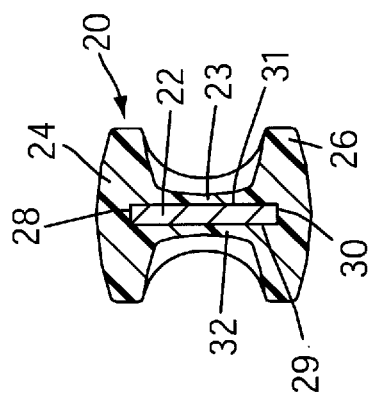
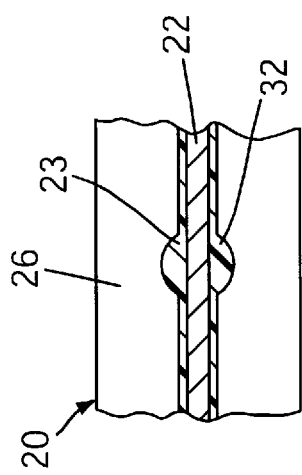
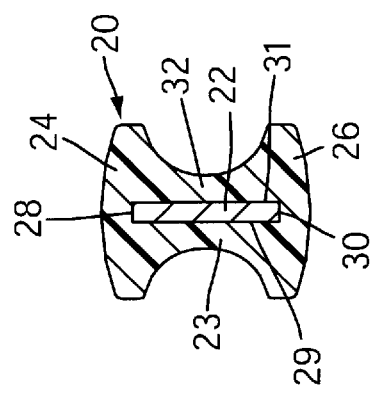
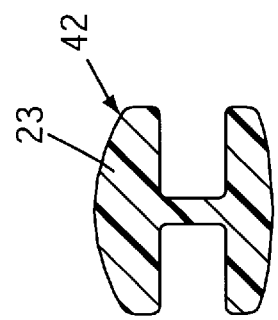
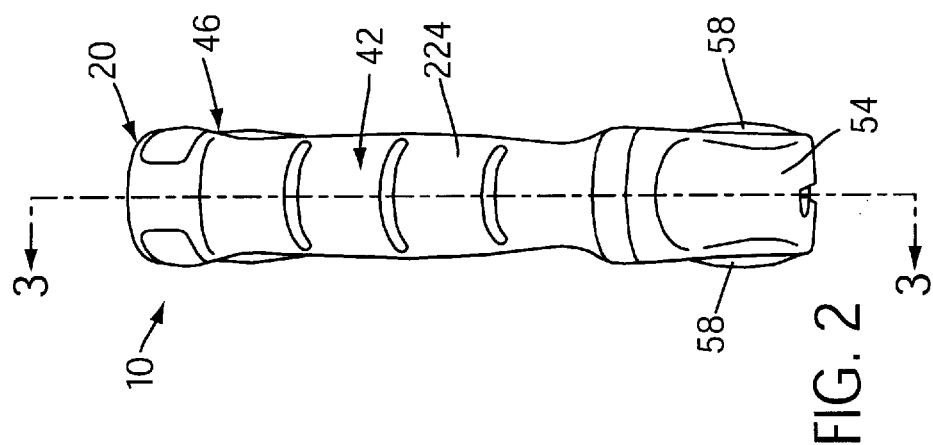

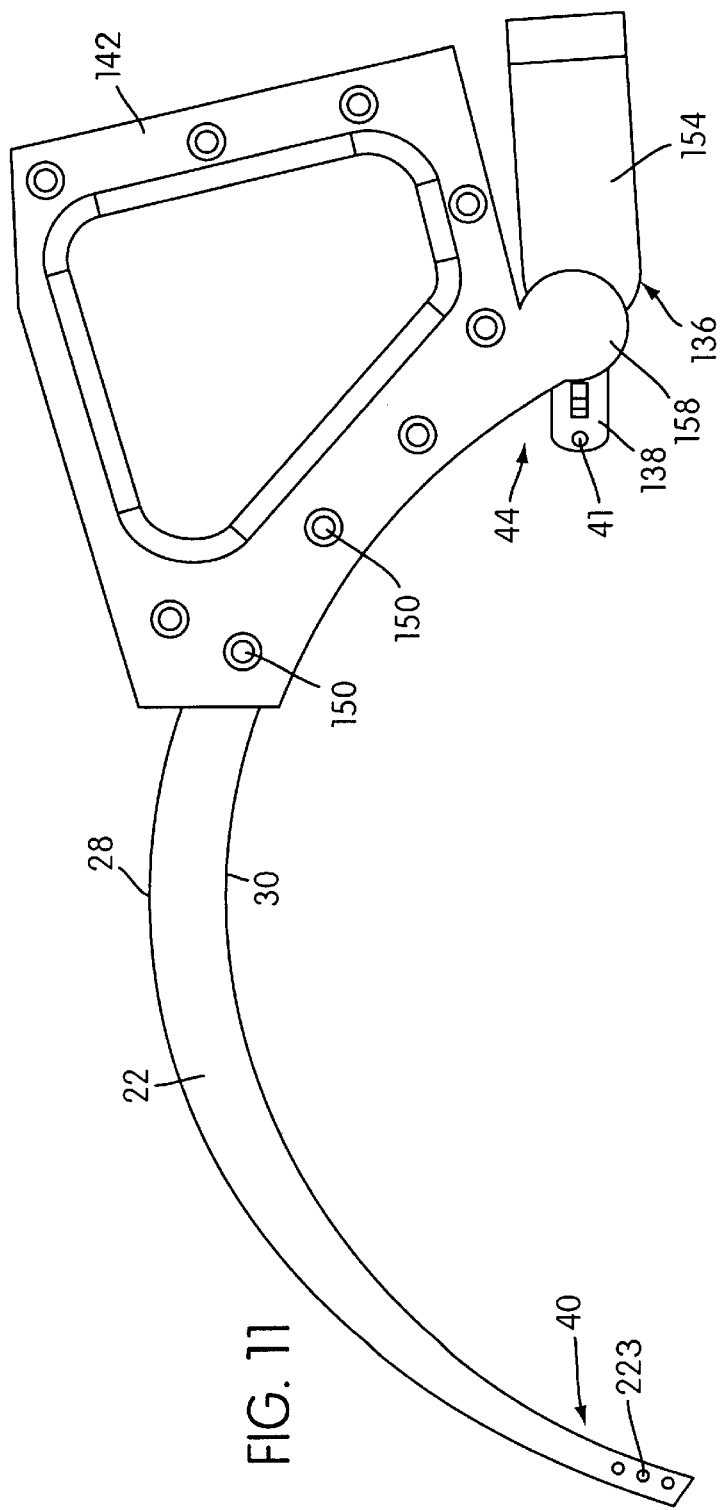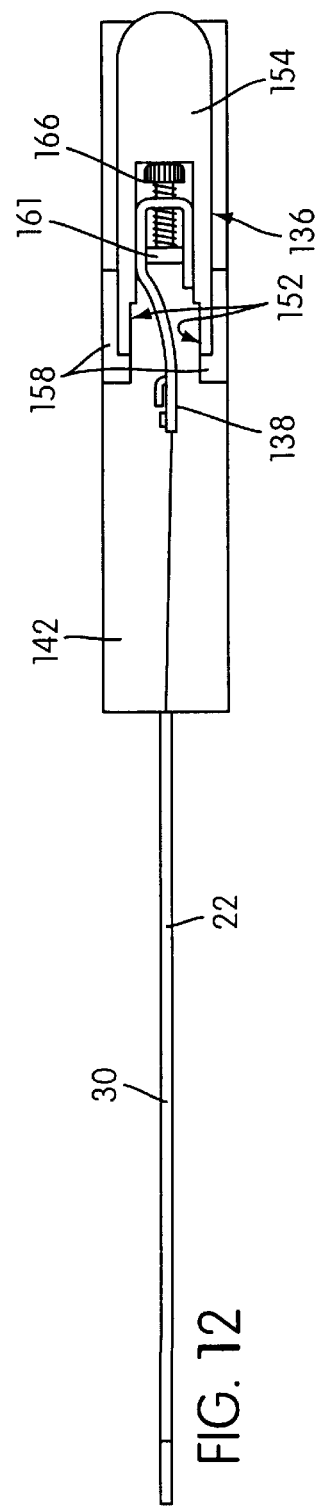

HACKSAW AND METHOD FOR MAKING THE SAME

FIELD OF THE INVENTION

The present invention relates to hacksaws.

BACKGROUND AND SUMMARY OF THE INVENTION

Conventional hacksaws have a rigid metal frame member, a handle member secured to a rear end of the frame member, and a blade tensioning device located below the handle member. One end of a serrated cutting blade is removably mounted to a forward end portion of the frame member and the other end is removably mounted to a blade tensioning device carried on or adjacent the handle member. Often the blade tensioning device is a wing nut that the user turns to tension the blade. In some arrangements the tensioning device is a pivotally mounted lever which the user pivots upwardly to tension the blade.

One problem with such conventional arrangements is that the entire metal frame member is exposed to moisture that can cause corrosion. Also, the frame member may become damaged or chipped when dropped or otherwise impacted against a hard surface. Conversely, the hard metal of the frame may damage certain surfaces, such as finished surfaces, when dropped thereon. A solution to this problem is to overmold the metal frame member with plastic material. The plastic material protects the frame member from corrosion and from direct impacts. This concept is shown in U.S. Pat. No. 5,673,488 to Grayo.

Simply molding plastic over the metal frame member as shown in the '488 patent does little to increase the overall strength and rigidity of the hacksaw frame member, however. The metal frame member still provides the hacksaw with almost all of its structural rigidity. The plastic just protects the metal member and improves the aesthetics of the hacksaw and provides a negligible amount of rigidity, if any. As a result, the metal frame member in the '488 patent must be made relatively thick to provide sufficient rigidity. However, this increases the overall cost and weight of the hacksaw.

It is therefore an object of the present invention to provide a hacksaw with a plastic/metal composite frame in which the plastic is specially configured to substantially contribute the frame's structural rigidity so that a lighter metal frame member can be used. To achieve this object, one aspect of the present invention provides a hacksaw comprising an elongated blade having opposing longitudinal end portions and a cutting edge between the longitudinal end portions and an over molded frame assembly in which the blade is mounted. The overmolded frame assembly includes a rigid metal frame member having a longitudinal portion thereof covered in surrounding relation by solidified plastic material. The solidified plastic material has an I-beam configuration with upper and lower end caps on opposing sides thereof extending longitudinally with respect to the frame member and a generally vertical web extending between the upper and lower end caps.

A first blade mounting structure is carried by the hacksaw and one of the longitudinal end portions of the blade being removably mounted on the first blade mounting structure. A releasable blade tensioning device is carried by the hacksaw and provides a second blade mounting structure. The other of the longitudinal end portions of the blade is removably mounted on the second blade mounting structure and the blade tensioning device is constructed and arranged to affect relative movement between the first and second blade mounting structures to tension the blade in the longitudinal direction thereof and thereby apply a rearwardly directed force to a forward end portion of the metal frame member. The blade tensioning device is also constructed and arranged to affect relative movement between the first and second blade mounting structures to release the tension and allow for removal and replacement of the blade. The rearwardly directed force applied to the forward end portion of the frame member creates a bending moment in the frame assembly which the metal frame member and the solidified plastic material with an I-beam configuration cooperate to resist. The hacksaw further includes a manually engageable handle member that can be manually grasped to enable performance of a cutting operation wherein the cutting edge of the tensional blade is engaged with a workpiece and moved forwardly and rearwardly to cut the workpiece.

The I-beam shape of the solidified, plastic material is particularly desirable because the upper and lower end caps are located at the points where the tensile forces are the highest in the frame member when a bending force is applied by the blade. Specifically, using the I-beam configuration provides the desired protection of the metal frame and also enhances the frame's overall structural rigidity. Thus, a lighter metal member can be used without sacrificing the durability and rigidity of the frame.

In one preferred embodiment of the hacksaw the handle member is molded integrally with the frame assembly from the solidified plastic material so as to define an overmolded handle and frame assembly.

It should be noted that, in accordance with this aspect of the invention, the molded plastic does not have to conceal the entire frame member. In fact, it is contemplated to leave small "windows" in the plastic material through which the metal of the frame member is visibly exposed. This allows the consumer to visibly confirm that a metal frame member is being used in the hacksaw's construction, which gives the impression of added ruggedness and durability that may not be conveyed by a construction wherein the frame member 22 is completely concealed and the consumer can only see a plastic exterior.

A related aspect of the present invention provides a method for making a hacksaw. The method of this aspect of the invention comprises providing a rigid metal frame member, overmolding molten plastic material in surrounding relation over a longitudinal portion of the frame member and solidifying the molten plastic material so as to provide the plastic material with an I-beam configuration having upper and lower end caps on opposing sides thereof extending longitudinally with respect to the frame member and a generally vertical web extending between the end caps. The manually engageable handle member is provided rearwardly of the metal frame member either before, during or after the overmolding and solidifying of the plastic material such that the metal frame member, the plastic material supporting the metal frame member and the handle member define the handle and frame assembly. The handle of the frame assembly provides a first blade mounting structure. The next step comprises mounting a releasable blade tensioning device with a second blade mounting structure to the handle and frame assembly. Opposing longitudinal end portions of an elongated blade are removably mounted to the first and second mounting structures. The blade has a cutting edge that extends generally between its longitudinal end portions. The tensioning device is constructed and arranged to affect relative movement between the first and second blade mounting structures to thereby tension the blade between the first and second blade mounting structures. The tensioned blade applies a rearwardly directed force to a forward end portion of the metal frame member so as to create a bending moment in both the metal frame member and the solidified plastic material with an I-beam configuration. The frame member and the plastic material cooperate to resist the bending movement created by the rearwardly directed force.

As mentioned above, conventional hacksaws often use threaded wing nuts to tension the blade. However, the proper amount of tension for hacksaw blades is relatively high and over time this tension can cause the threads on the wing nut to wear down. As a result of these threads wearing down, proper blade tension can be difficult to achieve because the worn down threads may permit jiggle or play of the wing nut. To this end, there have been provided blade tensioning devices that use pivoting levers to apply the required blade tension. For example, U.S. Pat. No. 5,826,344 to Phelon et al. discloses a hacksaw in which a lever is pivotally mounted on a pivot pin and a cam is used to move the lever between tensioning and releasing positions. The entire tension load applied by the blade, however, is borne by the pivot pin. As a result, either a more robust pivot pin must be used or else the pin will fatigue over time and hence cause failure of the tensioning device.

To overcome this problem, it is therefore an object of the present invention to provide a hacksaw having a tensioning device wherein the structure that mounts the device does not bear the full tension load of the blade. To achieve this object, another aspect of the present invention provides a hacksaw wherein the handle and frame assembly provides a generally rearwardly facing load bearing surface and wherein the tensioning device provides a load transmitting surface that is engageable with the load bearing surface. The mounting structure is spaced apart from the load bearing surface and movably mounts the blade tensioning device to the handle and frame assembly.

The tensioning device is constructed and arranged to be moved between (1) a blade tensioning position wherein the first and second blade mounting structures are moved relative to one another so as to tension the blade and thereby apply a generally forwardly directed force to the blade tensioning device and a rearwardly directed force to the forward end portion of the frame member and (2) a blade releasing position wherein the first and second blade mounting structures are moved relative to one another so as to release the tension from the blade and thereby allow removal and replacement of the blade. In the blade tensioning position, the load transmitting surface engages the load bearing surface so that at least a portion of the generally forwardly directed force applied to the tensioning device is transmitted to and borne by the load bearing surface, thereby preventing the entire forwardly directed force from being borne by the mounting structure.

Preferably the load bearing surface has an arcuate, convex configuration and the load transmitting surface has an arcuate, concave configuration and the load bearing surface is spaced generally forwardly from the mounting structure.

A further aspect of the present invention relates to the manner in which the metal hacksaw frame members are formed. Typically, metal frame members are stamped or otherwise cut from sheet metal blanks. Much of the sheet metal in these blanks is trimmed off when the members are form and is discarded as scrap. It is desirable to provide a method wherein the amount of scrap produced during the fabrication of the frame members is substantially reduced or eliminated.

It is therefore yet another object of the present invention to meet this desire. Yet another aspect of the present invention achieves this further object by providing a method of forming the frame member by disposing a sheet metal blank in a stamping die assembly, engaging a stamping die with the blank so as to separate a plurality of frame members with opposing first and second longitudinally extending edges from the blank, and then selecting the frame member from plurality of frame members. The stamping die engages the blank in such a manner that (1) the first edge of each frame member is sheared from and is substantially congruent with the second edge of a frame member which is immediately adjacent the first edge and (2) the second edge of each frame member is sheared from and is substantially congruent with the first edge of a frame member which is immediately adjacent the second edge.

Preferably the stamping die provides the first and second edges of each frame member with arcuate shapes and preferably the arcuate shape of the first edge of each frame member is defined along a portion of a first imaginary circle and the second edge of each frame member is defined along a portion of a second imaginary circle. The first and second imaginary circles having the equal radii and spaced apart centerpoints.

It can be appreciated that no metal needs to be trimmed from the longitudinal edges of the frame members stamped in accordance with the principles of the present invention. Specifically, because their first and second edges are congruent, no excess material is left therebetween. Of course, some filing and grinding operations may be performed to smooth out the edges after the stamping operation; but otherwise there is no need to trim material from the longitudinal edges.

Other objects, features, and advantages of the present invention will become apparent from the following detailed description, the accompanying drawings, and the appended claims.

BRIEF DESCRIPTION OF THE DRAWINGS

FIG. 2 is an end view of the hacksaw taken along the line of site 2—2 in FIG. 3;

FIG. 4 is a cross sectional view taken through the line 4—4 in FIG. 1;

FIG. 5 is a cross sectional view taken through the line 5—5 in FIG. 1;

FIG. 6 is a cross sectional view taken through the line 6—6 in FIG. 1;

FIG. 7 is a cross sectional view taken through the line 7—7 in FIG. 1;

FIG. 11 is a side elevational view of a second embodiment of a portion of a hacksaw showing a handle member and a releasable blade tensioning device mounted on a frame member of the hacksaw;

FIG. 12 is a bottom plan view of the portions of the hacksaw shown in FIG. 11;

DETAILED DESCRIPTION OF THE PREFERRED EMBODIMENTS OF THE INVENTION

Figure 1:
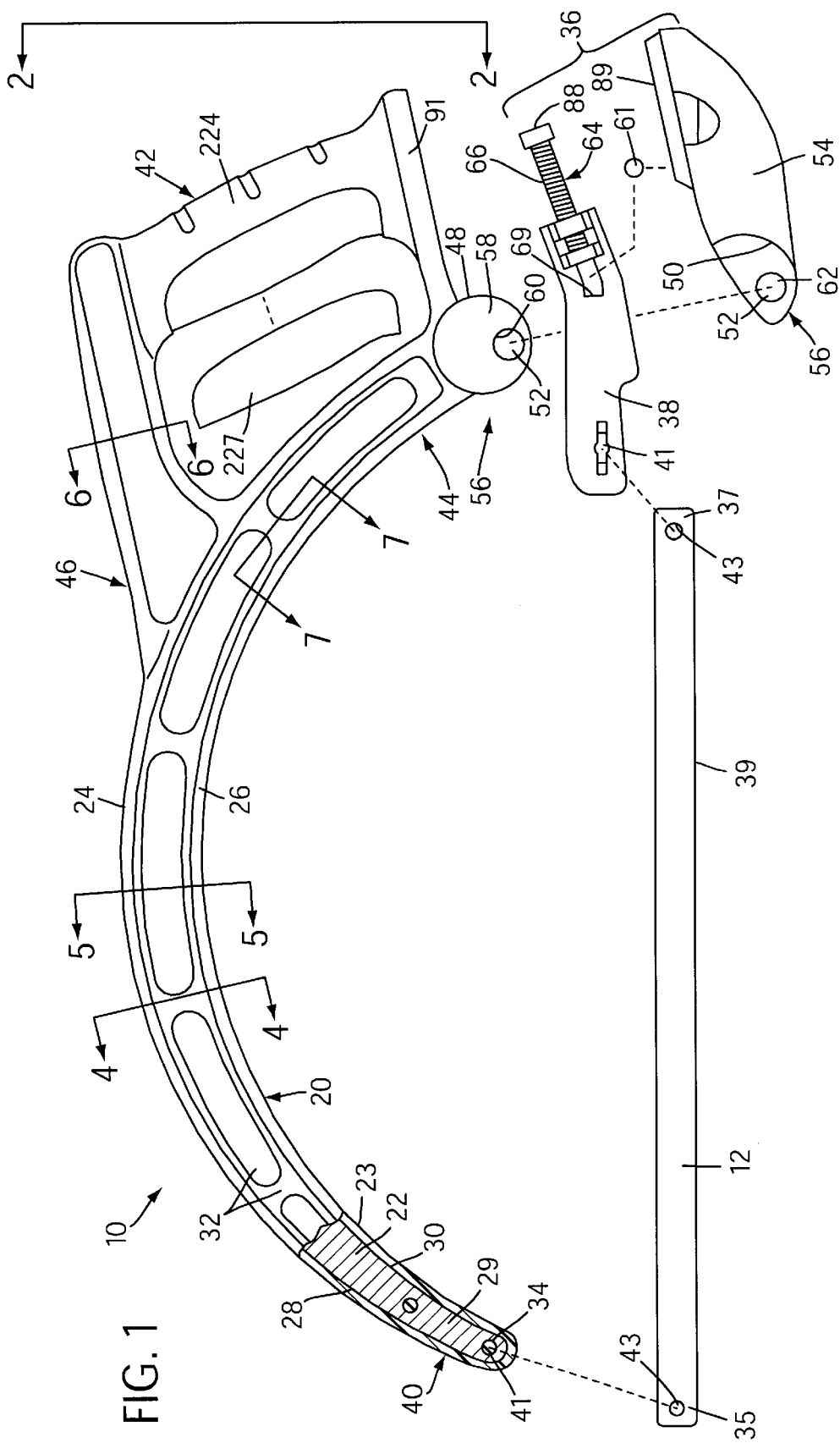
FIG. 1 is a partially exploded view of a hacksaw constructed according to the principles of the present invention.
Figure 3:
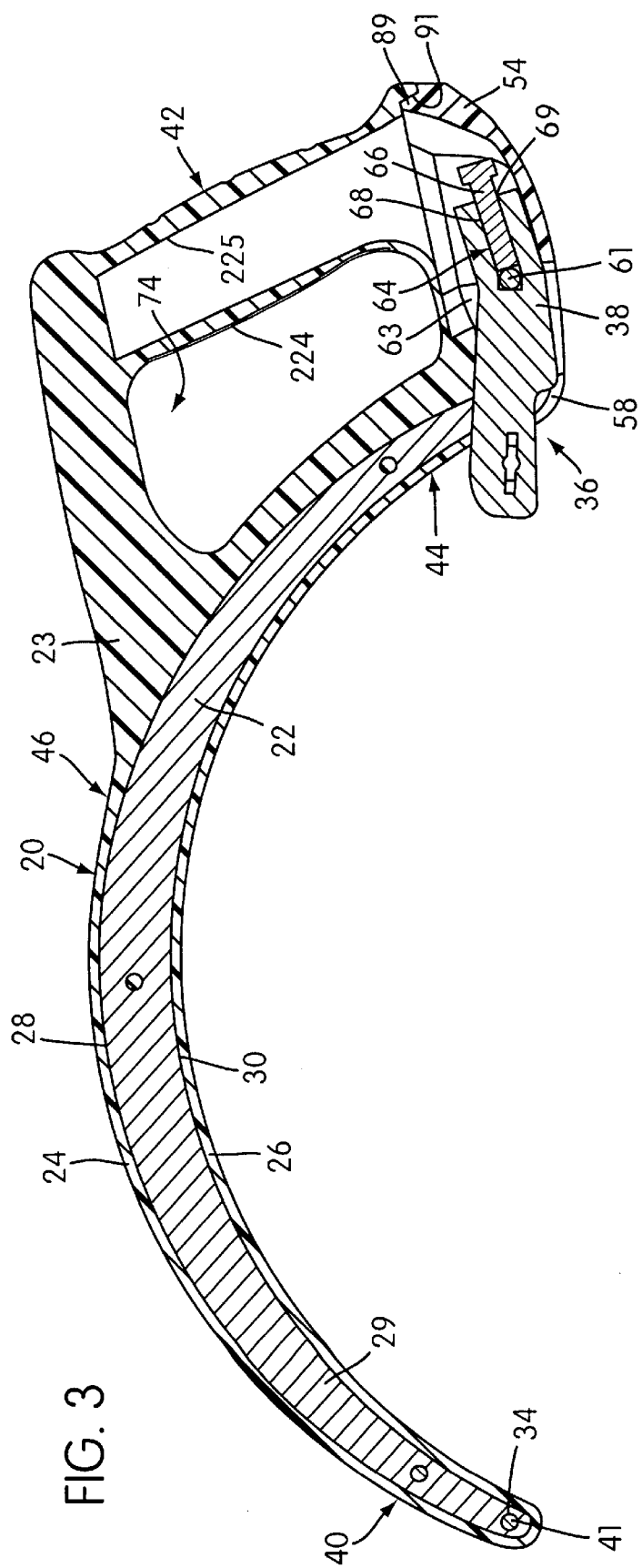
FIG. 3 is a cross sectional view of the hacksaw taken through the line 3—3 in FIG. 2.

FIG. 1 shows a partially exploded view of a hacksaw 10 constructed according to the principles of the present invention. The hacksaw 10 includes an elongated blade 12 and an overmolded frame assembly, generally indicated at 20. The structure of the overmolded frame assembly 20 can best be understood from FIGS. 1–7. The overmolded frame assembly 20 includes a rigid metal frame member 22 (shown, for example, in FIG. 3) having at least a longitudinal portion thereof covered in surrounding relation by solidified plastic material 23. The frame member 22 is preferably stamped from a piece of sheet metal with a curved shape (FIG. 3).

The solidified plastic material 23 surrounding the metal frame member 22 has an I-beam configuration (FIGS. 4–5) that forms upper and lower end caps 24, 26, respectively, and a generally vertically extending web 32 that extends integrally between the end caps 24, 26. The end caps 24, 26 are disposed along opposing, longitudinally extending upper and lower sides 28, 30 of the frame member 22. The vertical web 32 of plastic material covers the opposing side surfaces 29, 31 of the frame member 22. The plastic material 23 is molded over the metal frame member 22 to protect and reinforce the same. The frame member 22 extends through the generally vertical web member 32 and opposite upper and lower longitudinal edge portions 28, 30 of the frame member 22 extend into and are embedded in the upper and lower end caps 24, 26, respectively.

It should be noted that the molded plastic does not have to conceal the entire frame member 22. In fact, it is contemplated to leave small "windows" in the plastic material through which the metal of the frame member is visibly exposed. This allows the consumer to visibly confirm that a metal frame member is being used in the hacksaw's construction, which gives the impression of added ruggedness and durability that may not be conveyed by a construction wherein the frame member 22 is completely concealed.

A manually engageable handle member 42 is mounted on a rearward end portion 44 of the frame assembly 20. In one preferred embodiment of the hacksaw 10 (FIGS. 1–10), the handle member 42 is molded from solidified plastic material 23 so as to be integral with the plastic overmold on the frame assembly 20. In this preferred embodiment, the handle member 42 and the frame assembly 20 together define an overmolded handle and frame assembly 46 of the hacksaw 10.

A first blade mounting structure 34 is mounted on a forward end portion 40 of the frame assembly 20 and a releasable blade tensioning device 36 is mounted on the rearward end of the frame assembly 20. The blade tensioning device 36 provides a second blade mounting structure 38 generally rearwardly of the first blade mounting structure 34. The blade 12 is removably mounted on the blade mounting structures 34, 38. As will be explained, the releasable blade tensioning device 36 is provided to tension the blade 12 after it has been mounted on the mounting structures 34, 38 and to release tension from the blade 12 for replacement thereof.

The blade 12 has opposing longitudinal end portions 35, 37 and a serrated cutting edge 39 extending between the longitudinal end portions. When installed, one longitudinal end portion 35 of the blade 12 is removably mounted on the first blade mounting structure 34 and the second end portion 37 is removably mounted on the second blade mounting structure 38. Specifically, the first and second blade mounting structures 34, 38 each include a post 41 and the longitudinal end portions 35, 37 of the blade 12 each have an aperture 43 formed therethrough. The blade 12 is removably mounted to the blade mounting structures 34, 38 by inserting the posts 41 through the apertures 43. Then, the user moves the mounting structures 34, 38 relative to one another by manually operating the releasable blade tensioning device 36 to tension the blade 12.

Preferably, the blade tensioning device 36 is a lever 54 pivotally mounted on the handle and frame assembly 46 by mounting structure 52 for pivotal movement between the blade tensioning and the blade releasing positions. The mounting structure 52 is comprised of a pair of pivot pin connections 56 formed between the lever 54 and the handle and frame assembly 46. The pivot pin connections 56 are provided by a recess or aperture 60 formed in each of a pair of transversely spaced side walls 58 integrally formed of the plastic material 23 on the rearward end portion 44 of the frame assembly 20, and a pair of outwardly extending projections 62 formed on opposite sides of the lever 54. The projections 62 are pivotably received in the apertures 60 to allow for pivotal movement of the lever 54.

The second blade mounting structure 38 is mounted on the lever 54 for relative movement with respect to the lever 56 so that the fully tensioned position of the mounting structure 38 relative to the mounting structure 34 can be selectively adjusted. The tensioning device 36 includes an adjusting mechanism 64 that selectively adjusts the position of the second blade mounting structure 38 relative to the lever 54 and holds the second blade mounting structure 38 in its adjusted position.

The specific construction of the releasable blade tensioning device 36 can be appreciated from FIGS. 1, 3, and 8–9. The lever 54 may be molded from the same solidified plastic material 23 as used to overmold the frame and handle assembly 46, although it could alternatively be formed from metal. Alternatively, they can be molded from different materials. For example, the frame plastic may be molded from ABS and the lever plastic may be nylon. The lever 54 has a generally forwardly opening slot 63 in a forward end thereof. A pivot pin 61 extends transversely across the slot 63. The second blade mounting structure 38 is disposed within the slot 63 and mounted for pivotal and generally longitudinal movement on the transversely extending pin 61 in a manner best appreciated from the cross sectional view of FIG. 3.

The second blade mounting structure 38 is an elongated metal structure that has the transversely extending post 41 at a forward end thereof for removably mounting the blade 12 and a rearwardly opening elongated slot 69 in a rearward portion thereof. When the second blade mounting structure 38 is mounted on the lever 54, the pivot pin 61 extends laterally through the elongated slot 69 (FIG. 3). The adjusting mechanism 64 includes a threaded member 66 that is threadedly engaged with the second blade mounting structure 38 in a manner best seen in FIG. 3. Specifically, the rearward end second blade mounting structure 38 has structure defining an internally threaded bore 68 that opens into the slot 69 and the threaded member 66 is received in threaded engagement within the bore 68 such that a free end of the threaded member 66 extends into slot 69. When the blade 12 is mounted in the hacksaw 10 and the lever is pivoted fully upwards, the free end of the threaded member 66 abuts the transversely extending pivot pin 61 to limit the second blade mounting structure's movement relative to the lever 54 and, more particularly, to the first blade mounting structure 34. The amount of relative movement permitted between the blade mounting structures 34, 38 determines the amount of tension applied to the blade 12. As a result of this construction, the specific amount of relative movement permitted can be adjusted by turning the threaded member 66.

The rearward end portion 44 of the frame assembly 20 provides a generally rearwardly facing load bearing surface 48 (best seen in FIGS. 1 and 8) and the blade tensioning device 36 provides a load transmitting surface 50 (best seen in FIGS. 1–9) that is engageable with the load bearing surface 48 in a manner described below. The mounting structure 52 is spaced apart and separate from the load bearing surface 48 (see FIG. 8, for example). The surfaces 48, 50 engage one another in an abutting relationship to the blade tensioning load that would otherwise be borne by the mounting structure 52 when the blade tensioning device 36 is tensioning the blade 12. The manner in which this occurs is described below.

Figure 8:
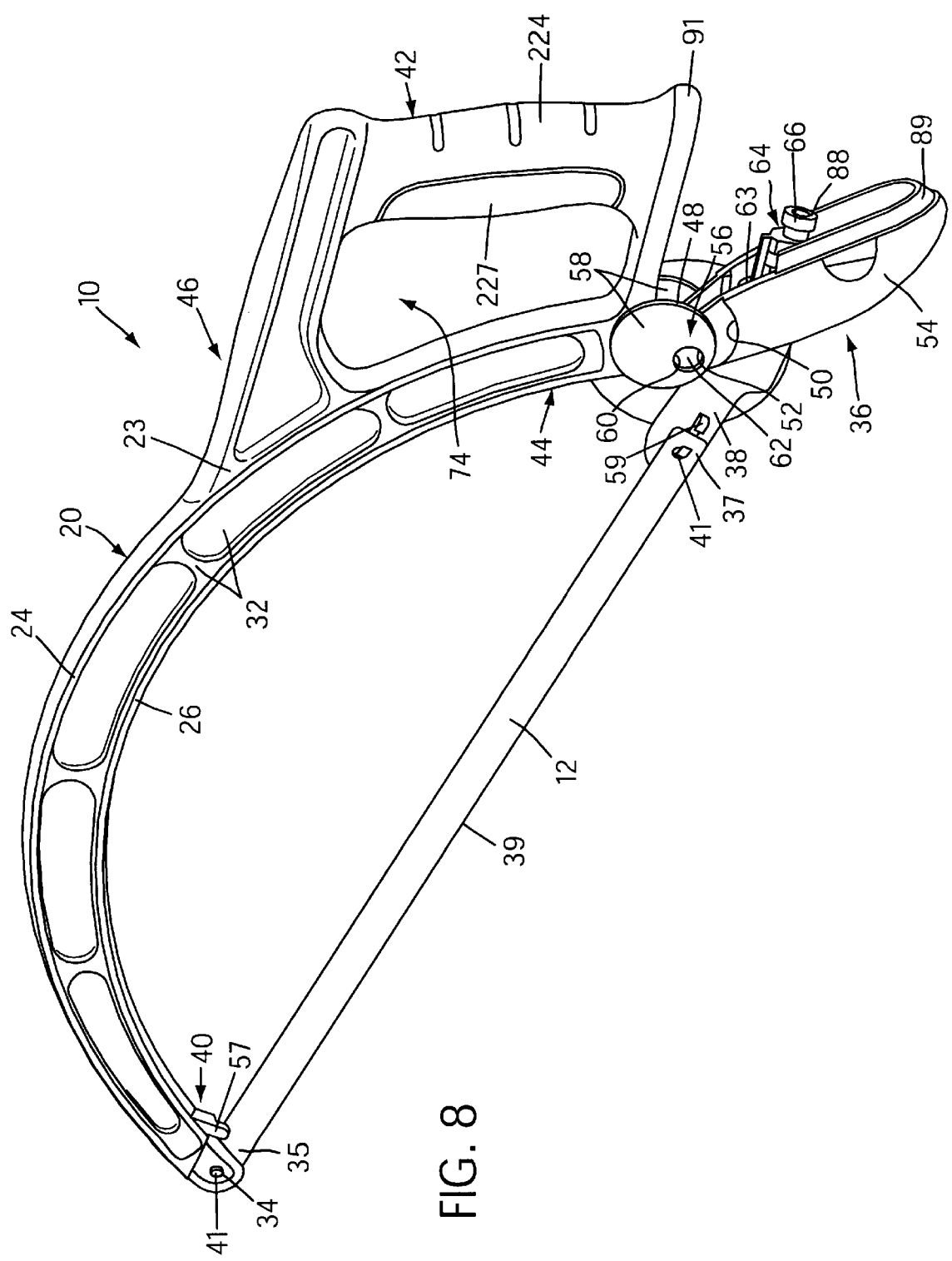
FIG. 8 is a forwardly looking perspective view of the hacksaw showing a releasable blade tensioning device thereof in a blade releasing position.
Figure 9:
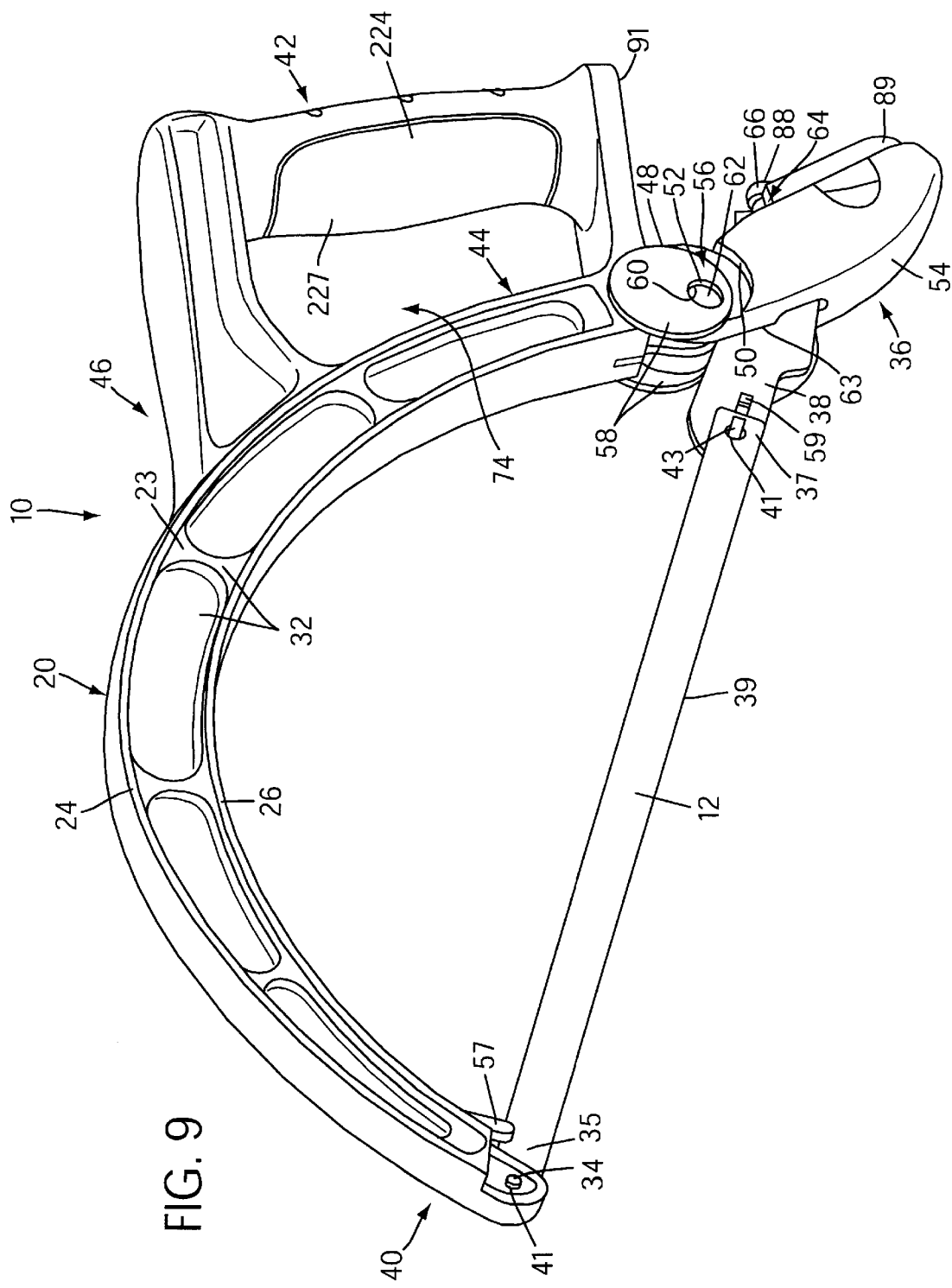
FIG. 9 is a rearwardly looking perspective view similar to the view of FIG. 8.
Figure 10:
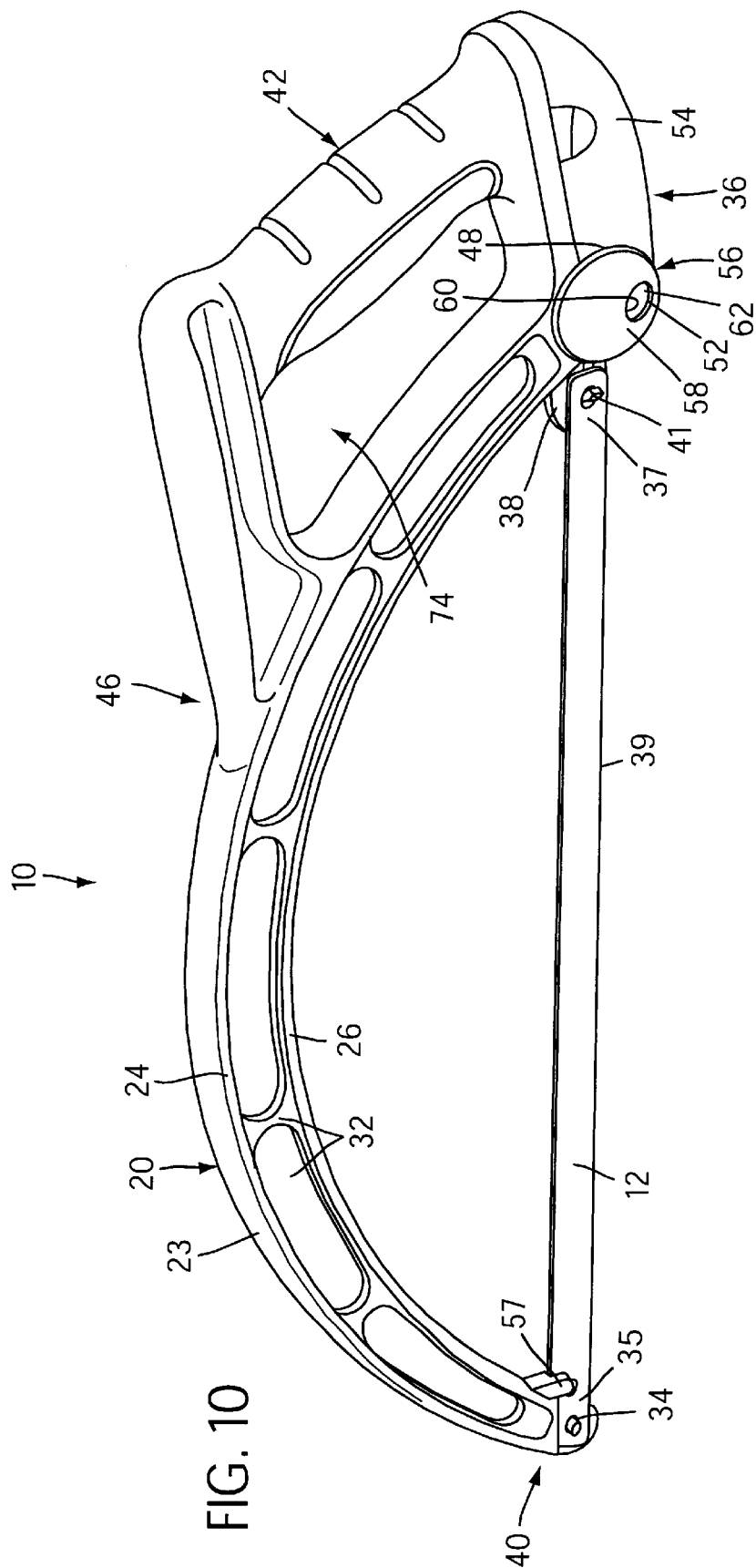
FIG. 10 is a downwardly and forwardly looking perspective view of the hacksaw showing the releasable blade tensioning device thereof in a blade retaining position.

It can be understood from a comparison of FIGS. 2, 3, 10 with FIGS. 8–9 that the blade tensioning device 36 moves between (1) a blade tensioning position (FIGS. 2, 3, 10) and (2) a blade releasing position (FIGS. 8–9). When the releasable blade tensioning device 36 is moved into the tensioning position, the first and second blade mounting structures 34, 38 are moved relative to one another so as to tension the blade 12 and thereby apply a generally forwardly directed force to the blade tensioning device 34 and a generally rearwardly directed force to the forward end portion 40 of the frame member 20. This movement also causes the load transmitting surface 50 to engage the load bearing surface 48 so that at least a portion of the generally forwardly directed force applied to the tensioning device 34 is transmitted to and borne by the load bearing surface 48, thereby preventing the entire forwardly directed force from being borne by the mounting structure 52. When the releasable blade tensioning device 36 is moved into the blade releasing position (FIGS. 8–9), the first and second blade mounting structures 34, 38 are moved relative to one another so as to release the tension from the blade 12 and thereby allow blade removal and replacement.

In the preferred embodiment of the hacksaw 10 shown in FIGS. 1–10, the load bearing surface 48 has an arcuate, convex configuration and the load transmitting surface 50 has a complimentary arcuate, concave configuration. However, it is to be understood that these elements could be reversed or have other shapes.

OPERATION

To mount the blade 12 in the hacksaw 10, the user moves the lever 54 to its blade releasing position (FIGS. 8–9) by pivoting the same downwardly about the pair of pivot pin connections 56 and then places the blade 12 over the posts 41. Flanges 57, 59 provided on the first and second blade mounting structures 34, 38, respectively, engage the side of the blade 12 to retain the ends 35, 37 on the respective posts 41. Preferably, the downward pivotal movement of the lever 54 is limited by abutting engagement between a surface on a forward end of the lever and a surface (not shown) on the handle and frame assembly 46 so that when the blade tensioning device 36 is in its blade releasing position, it is conveniently positioned (FIG. 8, for example) to mount a new blade 12 in the hacksaw 10.

When the lever 54 is in its blade releasing position, the load transmitting surface 50 on the lever 54 is moved out of abutting engagement with the rearwardly facing load bearing surface 48. Also, the lever 54 is pivoted relative to the blade mounting structure 38 so that a head portion 88 of the threaded member 66 is exposed and accessible to the user (FIG. 8). If necessary, the user can then turn the head portion 88 of the threaded member 66 in an appropriate direction to adjust the position of the second blade mounting structure 38 with respect to the lever 54 to thereby selectively adjust the amount of tension that will be applied to the blade when the tensioning device 36 is pivoted back to its blade tensioning position.

The user then pivots the lever 54 upwardly to its blade tensioning position (FIGS. 3, 10) which (1) causes relative movement between the first and second blade mounting structures 34, 38 to affect tensioning of the blade 12 and (2) moves the load transmitting surface 50 into an abutted engagement with the load bearing surface 48 so that the surfaces 48, 50 bear a portion of the tension force exerted by the blade 12. Thus, it can be understood that the load transmitting surface 50 engages the load bearing surface 48 so that at least a portion of the generally forwardly directed force applied to the tensioning device 36 is transmitted to and borne by the load bearing surface 48, thereby preventing the entire forwardly directed force from being borne by the pivot pin connection 56 which forms the mounting structure 52.

The relative movement of the blade mounting structures 34, 38 to tension to the blade 12 applies a rearwardly directed force to the forward end portion 40 of the metal frame member 22, which in turn creates a bending moment in the frame assembly 20 that the metal frame member 22 and the solidified plastic material 23 with the I-beam configuration cooperate to resist. It can be appreciated that the plastic material 23 provides a substantial portion of the frame's bending resistance as a result of its I-beam configuration.

It can be appreciated from FIG. 3 that when the lever 54 is in its blade tensioning position, the transversely extending pin 61 is generally in line with or slightly above an imaginary line defined by the axial centers of the posts 41. This position of the pin relative to the imaginary line provides the tensioning device 36 with an "over-center" action that is sufficient to maintain the lever in its blade retaining position against the force applied to the blade tension device 36 by the tensioned blade 12. The lever 54 includes an integral U-shaped wall structure 89 that is sized to be received within wall structure 91 formed on the bottom of the handle member 42. Optionally, the wall structures 89, 91 may be constructed so that the lever 54 is press fit into engagement with a handle member 42 when the lever 54 is moved into its blade retaining position. This press-fitting engagement between the walls 89, 91 could, for example, be accomplished by providing the plastic material 23 of the first wall structure with at least one detent structure and the other wall 89 or 91 with a recess to receive the at least one detent to hold the two members 42, 54 in engagement when the lever 54 is in its blade tensioning position.

With the lever 54 moved into its blade tensioning position, the hacksaw 10 is ready to be used to cut a workpiece. The handle member 42 is provided with an opening 74 formed therethrough through which a user can insert his fingers for manually grasping. Then, the user can perform a cutting operation wherein the cutting edge 39 of the tensioned blade 12 is engaged with a workpiece and moved forwardly and rearwardly to cut through the same.

The construction of another embodiment of the hacksaw, generally designated 110, is shown in FIGS. 11–15. The structure of the hacksaw 110 is similar to the construction of hacksaw 10 and identical structures between the two embodiments are designated by identical reference numbers and are not further described. The main differences between the hacksaws 10, 110 reside in differences in the structures of the handle members 42,142 and the structures of the releasable blade tensioning devices is 36, 136.

Figure 13:
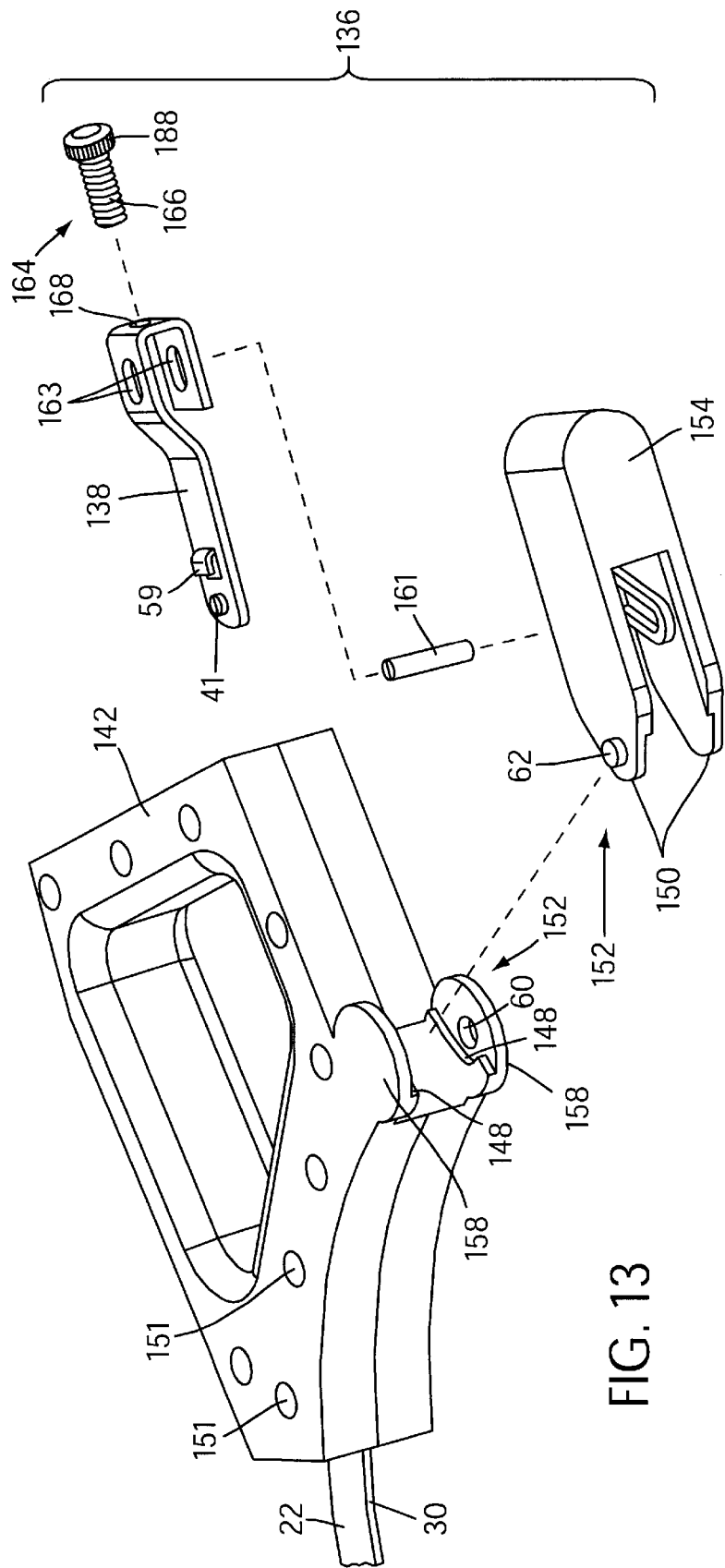
FIG. 13 is an exploded view of the portions of the hacksaw shown in FIG. 12 with the frame member shown in fragmentary view.

In the hacksaw 110, the handle member 142 is a rigid metal structure that is mounted to the rear half of the metal frame member 22 by rivets 151 (FIGS. 11–13). In the embodiment shown, the handle member 142 is a cast metal structure formed of a lightweight, high-strength metal, such as aluminum, that is formed in two halves and secured together by rivets 151. Molten plastic material 23 is then molded over the handle member 142 and solidified to form the I-beam structure on the metal frame member 22 and to form a grippable handle structure 153 around the handle and frame assembly 146 of the hacksaw 110 (FIGS. 14–15).

The lever 154 of the releasable blade tensioning device 136 is preferably a metal structure and the second blade mounting structure 138 is a hook-shaped structure (FIG. 11) that is also preferably made of metal. The second blade mounting structure 138 is mounted on a transversely extending pin 161. The pin 161 extends transversely through oval apertures 163 in the mounting structure 138. The threaded member 166 of the adjusting member 164 extends through internal threading formed within a threaded bore 168 in the second blade mounting structure 138 and abuttingly engages the pin 161 to adjust the position of the second blade mounting structure 138 with respect to the lever 154. The lever 154 is movably mounted to the handle and frame assembly 146 by a pivot pin connection 152 that is similarly constructed to connection 56.

The load transmitting surfaces 150 on the lever 154 face generally forwardly and are convex. The load bearing surfaces 148 are formed in the spaced side walls 158 on a lower portion of the handle member 142. The load bearing surfaces 148 are generally concave and face rearwardly.

Figure 14:
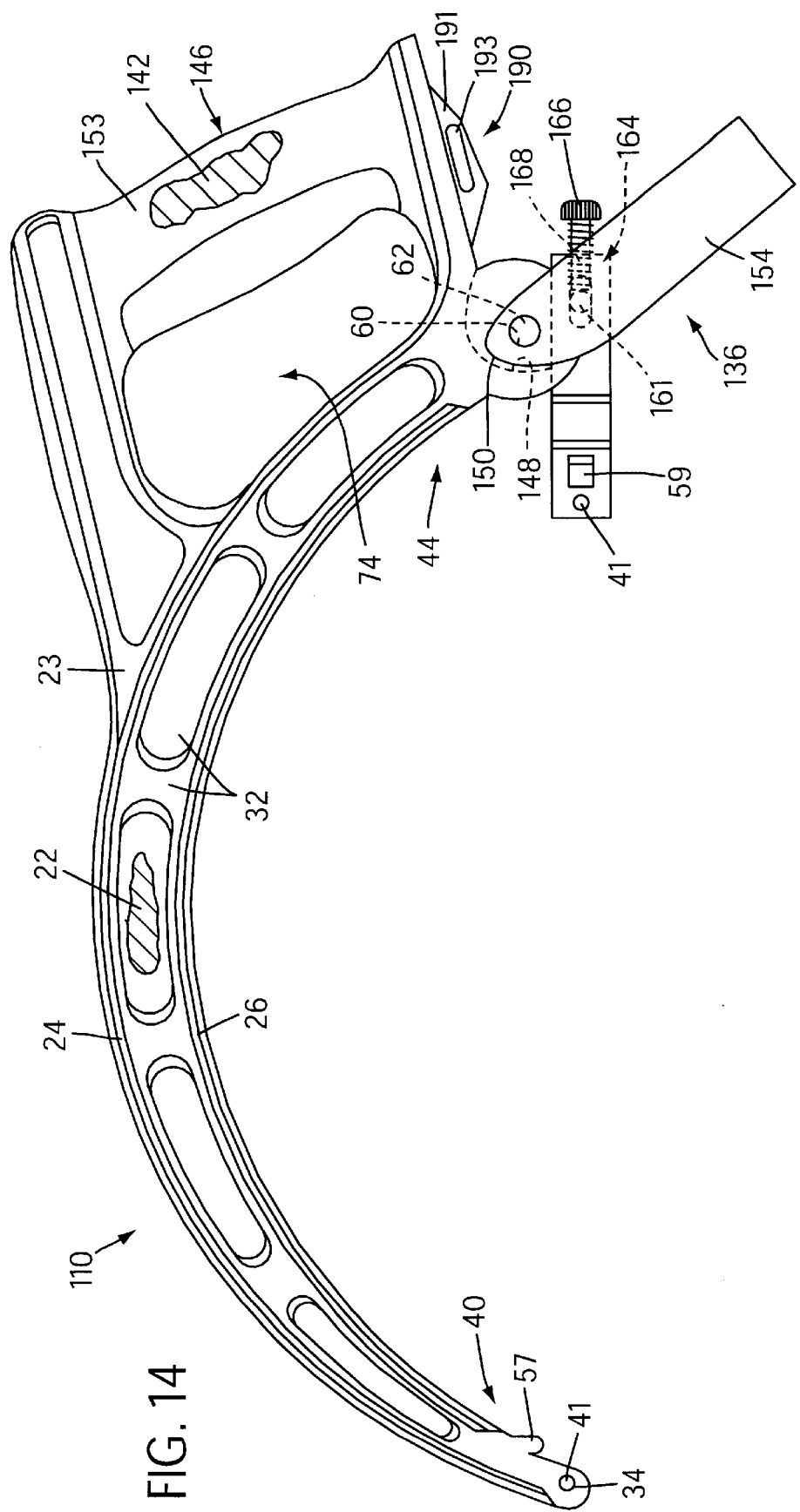
FIG. 14 is a side elevational view of the second embodiment of the hacksaw showing a blade tensioning device thereof partially in phantom lines and in a blade releasing position.
Figure 15:
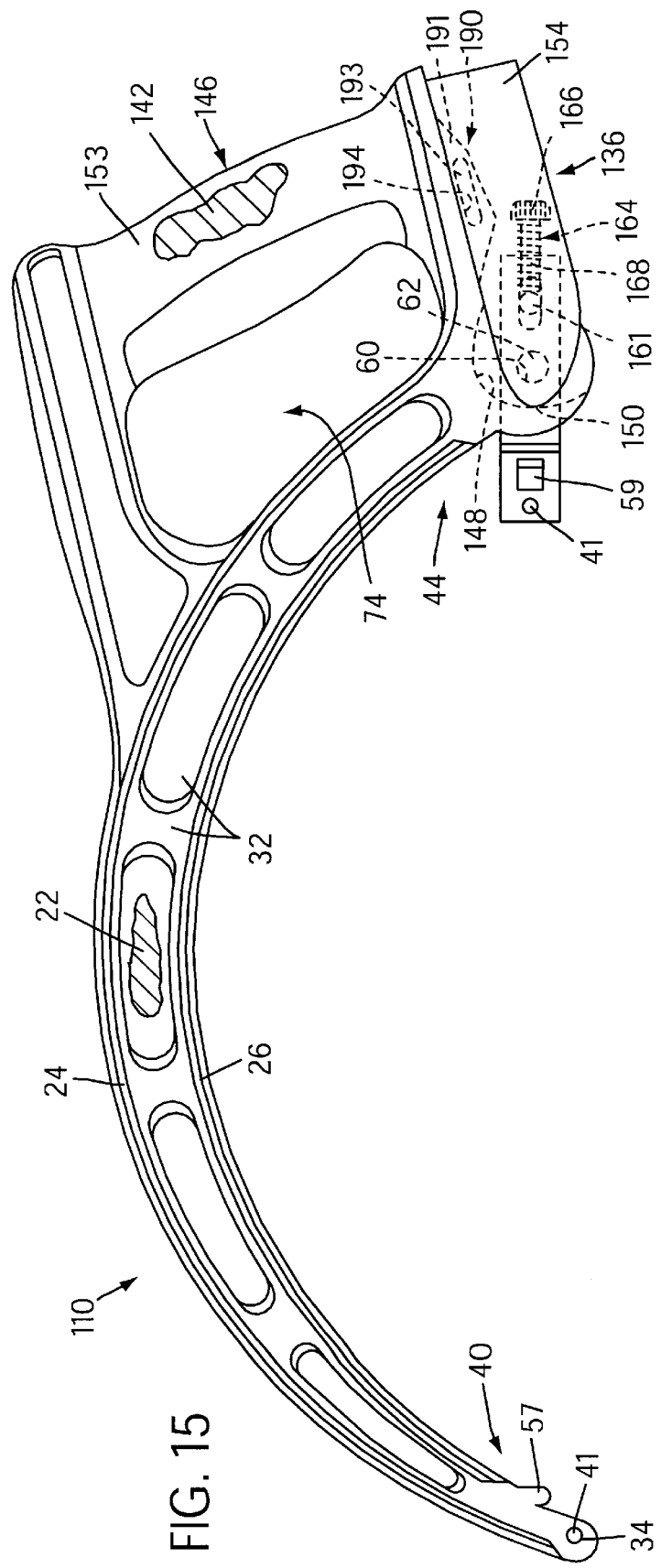
FIG. 15 is a view similar to the view of FIG. 13 but showing the blade tensioning device in a blade retaining position.

As shown in FIGS. 14–15, the frame member 22 and the handle member 142 are covered with solidified plastic material 23. The plastic material 23 that surrounds the frame member 22 forms an I-beam structure to strengthen and rigidify the frame member 22 to resist the bending moment created as a result of the force exerted on the forward portion of the frame assembly by the tensioned blade (not shown). The plastic material 23 covers both the frame member 22 and the handle member 142 to form a handle and frame assembly 146 for the hacksaw 110.

It can be understood from an examination of FIGS. 14–15 that the operation of the hacksaw 110 is similar to the operation of the hacksaw 10. Consequently the operation of hacksaw 110 will not be considered in detail. Locking structure 190 (which is optional and shown only for illustrative purposes) is integrally formed on a downwardly extending wall structure 191 molded of the plastic material 23 on a bottom surface of a handle structure 153. The locking structure 191 includes a raised structure or detent 193 that is received within a complementarily shaped groove 194 formed on an interior surface of the lever 154. When the lever 154 is moved to its blade tensioning position, the locking structure 190 is press-fit into the groove 194 to help hold the lever 154 in its blade tensioning position.

Similar to tensioning device 36 of hacksaw 10, the blade tensioning device 136 of the hacksaw 110 is maintained in its blade retaining position because the axis defined by the pivot pin 161 is co-linear with or slightly above an imaginary longitudinally extending line between the posts 41 when the lever 154 is in its blade retaining position. One skilled in the art will thus understand that the pin 161 of the lever 154 is in a co-linear or, alternatively, a slightly overcentered position when it is in its blade tensioning position and is held there by the tensional force exerted by the blade 12. Thus, the use of the locking structure 190 is optional and not necessary to lock the lever in its blade retaining position.

METHOD OF MANUFACTURING

Figure 16:
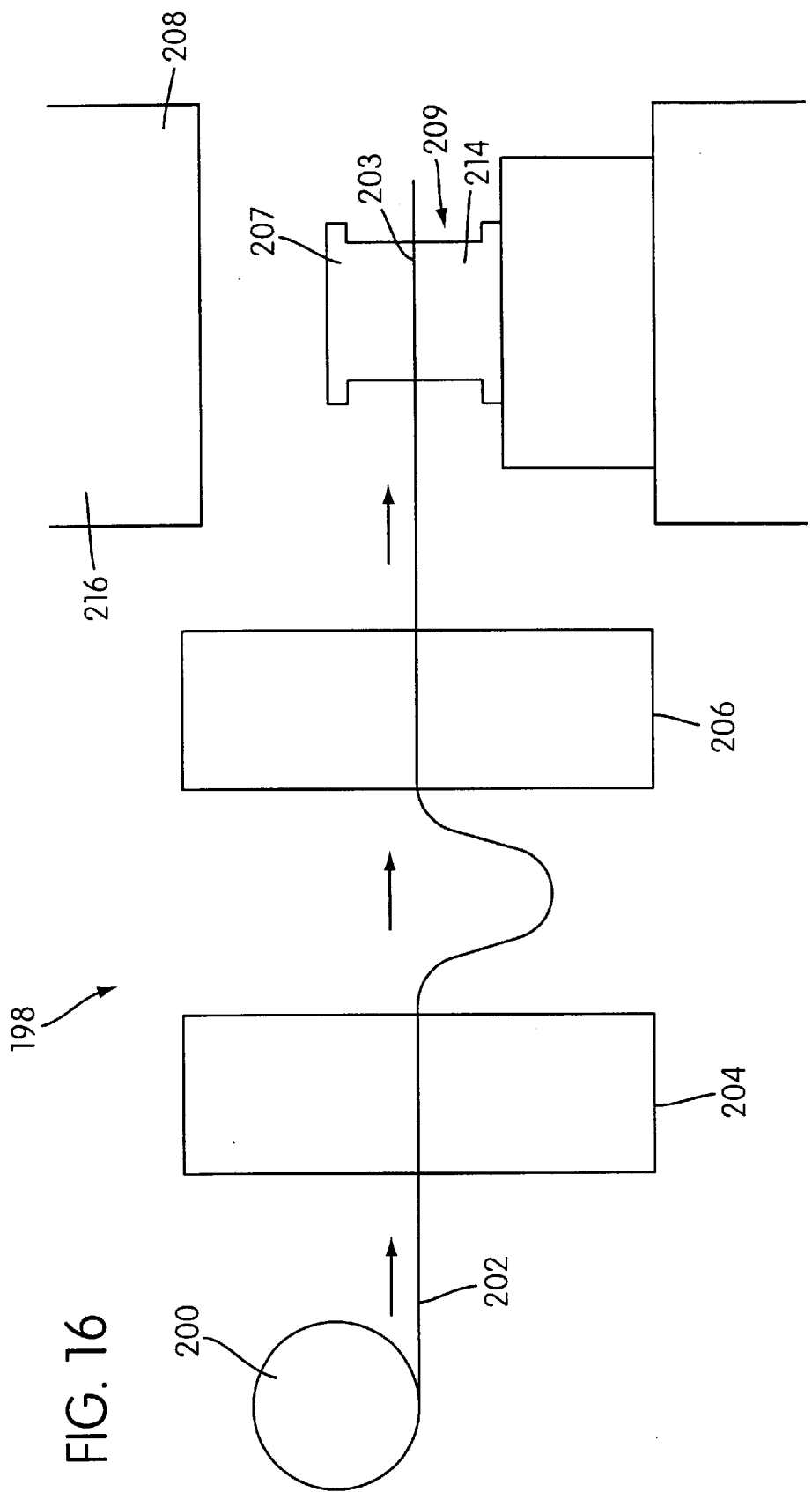
FIG. 16 is a schematic view of a stamping die assembly for constructing a plurality of frame members constructed according to the principles of the present invention from a metal blank.

The hacksaws 10, 110 can be easily and inexpensively manufactured. Preferably, the metal frame members 22 stamped from a sheet metal blank using a conventional stamping assembly, generally designated 198 and shown schematically in FIG. 16. A coil 200 disposed at an upstream end of the assembly 198 contains a rolled supply of sheet metal 202, preferably steel, although any material of suitable strength can be used. The sheet metal 202 is unrolled with the free end thereof defining. The unrolled sheet metal 202 is fed through a conventional straightener 204 to flatten out sheet metal being unrolled. The blank is then fed through a feeder 206 and subsequently into a stamping die 207 of a die assembly 209. The straightener 204 straightens the sheet material 202 as it is rolled from the coil 200 and the feeder 206 moves the sheet material 202 in a feeding direction into position on the stamping die 207 to be cut into a plurality of frame members 22. When the leading edge of the sheet of material 202 is in the proper position relative to the stamping die 207, movement of the sheet of metal 202 in the feeding direction stops and a cutting press 208 is actuated to close the stamping die assembly 209 on the blank 203 so as to separate a plurality of frame members 22 with opposing first and second longitudinally extending edges 28, 30 respectively, from the blank 203. The stamping die assembly 209 comprises a fixed support structure 214 that supports the blank 203 during the stamping operation and a hydraulic press ram 216 that moves the stamping die 207 in a reciprocating manner through a stamping cycle wherein the die stamps the blank 203 to form the frame members 22.

Figure 17:
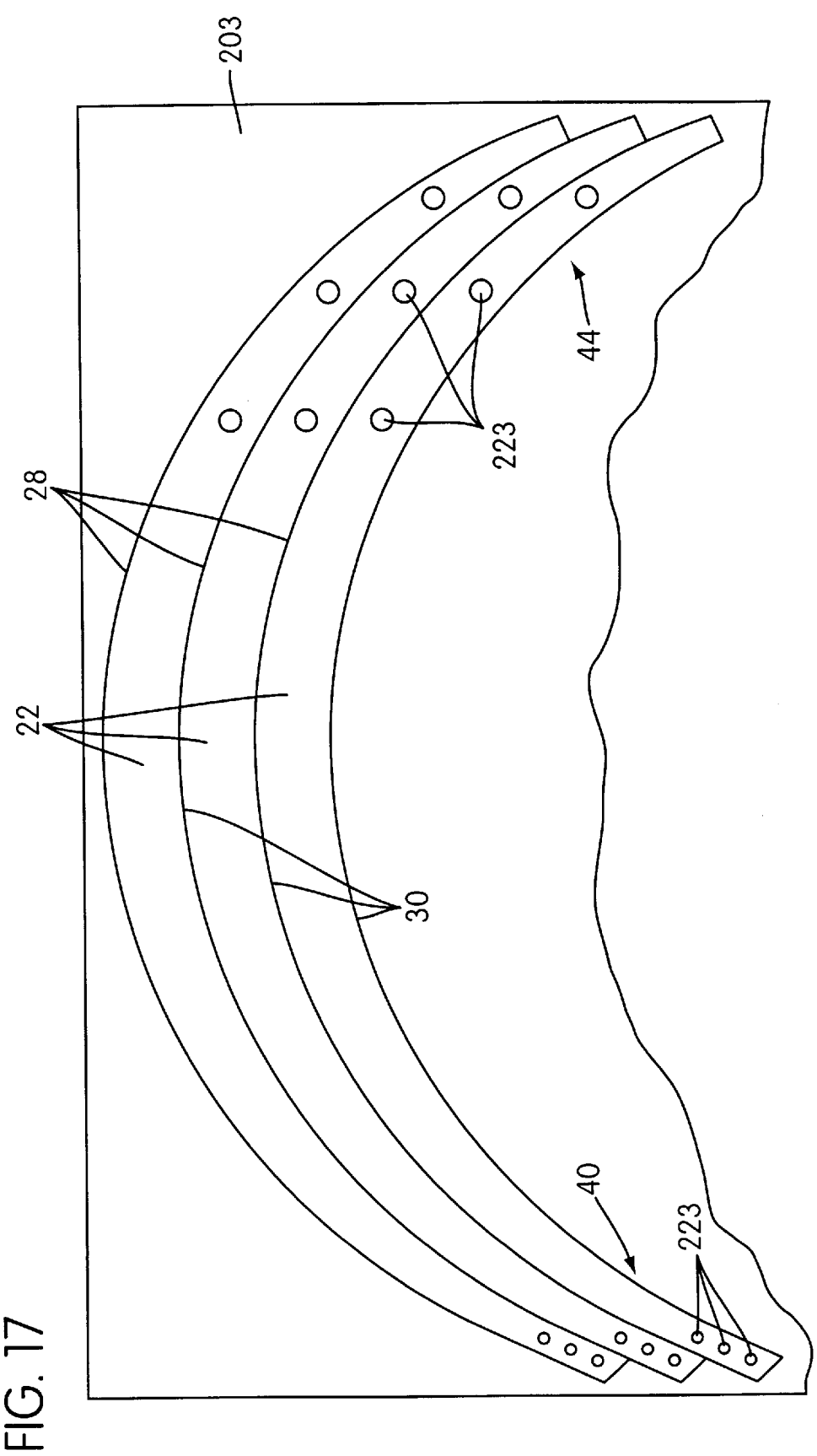
FIG. 17 is a fragmentary view of a blank sheet of material from which a plurality of the frame members have been cut.

A fragmentary portion of a blank 203 is shown in FIG. 17. The plurality of frame members 22 that have been cut from the blank 203 in one stamping operation are shown. It can be appreciated that the frame members 22 are cut from the blank 203 in a manner which minimizes the amount of excess (i.e., scrap) metal generated during the manufacturing process. More specifically, it can be appreciated that (a) the first edge 28 on each frame member 22 is sheared from and is substantially congruent with the second edge 30 of a frame member 22 which is immediately adjacent the first edge 28 of the adjacent frame member and (b) the second edge 30 of each frame member 22 is sheared from and substantially congruent with the first edge 28 of the frame member 22 which is immediately adjacent the second edge 30. As a result, there is no need to trim off excess metal from between the first and second edges of adjacent frame members 22.

The first and second edges 28, 30 of each frame member 22 have arcuate shapes along a substantial portion of their edges 28, 30. Preferably, the arcuate shape of the first edge 28 of each frame member 22 is defined along a portion of a first imaginary circle (not shown) and the arcuate shape of the second edge 30 of each frame member is defined along a portion of a second imaginary circle (not shown). Preferably the metal frame member 22 is constructed such that the first and second imaginary circles have equal radii and such that the centerpoints of the two imaginary circles are spaced apart. After the metal frame member 22 is cut from the sheet of material, the sides and ends of the member 22 may be filed or ground to eliminate sharp edges or burrs. The frame members 22 may optionally be provided with apertures 223 during the stamping process.

Generally, the steps of a method for making the hacksaw 10 or 110 include providing a rigid metal frame member 22, overmolding molten plastic material 23 in surrounding relation over at least a longitudinal portion of the frame member 22, solidifying the molten plastic material 23 so as to provide the plastic material 23 with an I-beam configuration having upper and lower end caps 24, 26 on opposing sides 28, 30 thereof extending longitudinally with respect to the frame member 22 and a generally vertical web 32 extending therebetween. It is within the scope of the present invention to connect a manually engageable handle member rearwardly of the metal frame member 22 either before or after overmolding and solidifying the plastic material 23. Alternatively, the handle may be formed entirely from the plastic material during the overmolding step.

Preferably, the molten plastic material is overmolded in surrounding relation over at least a longitudinal portion of the frame member 22 and is thereafter solidified by (1) providing an injection molding die assembly that has interior surfaces that cooperate to define a molding cavity, (2) disposing the frame member 22 in the molding cavity, (3) injecting the molten plastic material into the cavity such that the plastic material surrounds at least a longitudinal portion of the frame member, (4) solidifying the plastic material in the molding cavity and (5) removing the frame member 22 with the solidified plastic material 23 thereon from the mold cavity. As is conventional, the injection molding die assembly includes a pair of die halves, each die half providing the interior surfaces that cooperate to define the molding cavity. The molding cavity is shaped to provide the plastic material with the I-beam configuration as aforesaid.

It can thus be understood that one of the broad teachings of the present invention is a method of constructing a hacksaw by surrounding at least a longitudinal portion of a metal frame member that forms a portion of the core of the hacksaw with a solidified plastic material that strengthens and rigidifies the metal frame member; and that it is contemplated to provide a wide variety of hacksaws that use this reinforced, overmolded construction. Because a wide range of constructions are possible, the steps for constructing a particular embodiment of a hacksaw can vary widely from one another. For example, as mentioned, it is contemplated to provide embodiments of a hacksaw in which the handle member is a separate metal (or other non-molded plastic material) that is rigidly attached to the metal frame member before or after the molding step. Alternatively, the handle member can be constructed entirely of solidified molded plastic material and can thus be formed in the same molding cavity used to provide the I-beam structure around the frame member. Similarly, the blade tensioning device and the second blade mounting structure can be constructed and assembled in a wide variety of ways.

When a separate, non-molded plastic handle member (such as handle member 146 of hacksaw 110) is provided, preferably it is mounted on the frame member 22 before overmolding the molten plastic material 23. The handle member 146 can be constructed of any rigid material of sufficient strength over which a suitable molten plastic material can be molded and solidified. The handle member 146 is rigidly mounted on a rearward end portion of the frame member 22 using conventional fasteners such as rivets 151. Preferably when the non-molded plastic handle member 146 is secured in to the frame member 22 before the plastic material molding step, the molten plastic material is molded over both the frame member 22 and the handle member 146 so as to define an overmolded handle and frame assembly that includes both the frame member and handle member. When this construction is used, the entire rigid metal core of hacksaw (the core comprising the frame member and handle member) is covered with an integral overmolded solidified plastic material that protects the metal from corrosion and from damage and that strengthens and rigidifies the frame member 22 and handle member.

Preferably, the forward end portion of the frame member 22 is provided with at least one aperture 223 (FIG. 17, for example) sized to receive a post 41 to provide the first blade mounting structure 34. The post 41 is a cylindrical metal structure and is secured within the aperture 223 using any means known to one skilled in the art. The post 41 can be mounted in the frame member 22 either before the molding operation is commenced (which is preferred) or after the frame member 22 has been removed from the mold. When a separate metal handle member is mounted to the frame member 22, the rearward end portion 44 of the frame member 22 is provided with a series of apertures 223 (FIG. 17) to receive the rivets 151 used to secure the handle member 146 to the frame member 22. The apertures 223 can be formed in the frame member 22 before the blank 203 is placed in the die assembly, after the blank 203 has been cut by the die assembly or, can be formed during the cutting operation performed by the stamping die.

Furthermore, the handle member 142 can be a hollow cast metal structure formed as one integral piece or can be a stamped or cast (or formed in any other known manner) metal structure formed of complementary halves that are secured together and to the frame member 22 with the rivets 151.

When the handle member 42 is an integral structure formed of the solidified plastic material 23 as in hacksaw 10 (FIGS. 1–10), preferably at least the upper portion of the handle member 46 is molded to have an I-beam construction (FIG. 6). This construction minimizes the amount of plastic material used in the construction and provides maximum strength and rigidity of the integral molded plastic handle member 46. The cross-section of FIG. 3 shows that a gripped, rearwardmost portion 224 of the handle member 42 has a hollow interior 225. A forwardly facing surface of a gripped portion 224 of the handle member 42 may optionally be provided with an overmolded layer of a soft (relative to the hardness of the solidified plastic material 23) rubber-like material 227 that may be optionally provided with a gripped-enhancing texture. The material 227 is shown in exploded relation to the handle member 42 in FIG. 1.

It can be appreciated that it is also contemplated to provide a hacksaw having an overmolded handle and frame assembly that only partially covers the longitudinal portion of the frame member 22 with plastic material so that, for example, the metal of either the forward end portion 40 or the rearward end portion 44 of the frame member 22 remains exposed after formation of the molded plastic I-beam structure, although it is preferred to completely cover all metal portions of the frame member (and separate rigid metal handle member, if provided) of the hacksaw to prevent corrosion of the metal, to structurally reinforce the metal frame member (and metal handle member) and to provide a hacksaw that has little or no exposed metal which can damage a workpiece if the hacksaw frame comes into contact with the workpiece by dropping or accidental impact.

It can also be understood by one skilled in the art that the method of forming the metal frame members 22 from a blank sheet 203 of metal with little or no waste or scrap material is in itself a great advantage in manufacturing a hacksaw. It is therefore contemplated to provide a hacksaw that generally includes (1) a metal frame member constructed according to the principals taught herein, (2) a rigid handle member secured to one longitudinal end of the frame member, (3) a first blade mounting structure mounted to one longitudinal end of the frame member, (4) a releasable blade tensioning device mounted to an end of the frame member opposite the one longitudinal end and (5) a second blade mounting structure movably mounted on the blade tensioning device. Thus, it is contemplated to provide an embodiment of the metal frame member that is of sufficient rigidity and strength to resist the bending moment of a tensioned blade mounted in the first and second mounting structures without necessarily using an overmolded frame assembly.

One skilled in the art will understand that the preferred embodiment of the hacksaw 10 is exemplary only and not intended to limit the scope of the invention. Rather, the hacksaw 10 is intended to teach broad principles that can be used on a wide range of hacksaws. The hacksaw 10 illustrates, for example, the structure of a low-cost, high strength, lightweight handle and frame assembly that uses a single metal frame member 22 surrounded by solidified plastic material 23.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

What is claimed:

1. A hacksaw comprising:
   an elongated blade having opposing longitudinal end portions with a cutting edge between said longitudinal end portions;
   a handle and frame assembly comprising:
   (i) a rigid frame member having a forward end portion providing a first blade mounting structure, one of said longitudinal end portions of said blade being removably mounted on said first blade mounting structure;
   (ii) a manually engageable handle member connected rearwardly of said rigid frame member and being constructed and arranged to be manually grasped to enable performance of a cutting operation wherein the cutting edge of the blade is engaged with a workpiece and moved forwardly and rearwardly to cut the workpiece;
   (iii) a generally rearwardly facing load bearing surface having an arcuate, concave configuration; and
   (iv) tensioning device mounting structure spaced generally forwardly of said load bearing surface;
   a lever pivotally mounted to said mounting structure, said lever providing a second blade mounting structure and a load transmitting surface having an arcuate, convex configuration that is engageable with said generally rearwardly facing load bearing surface, the other of said longitudinal end portions of said blade being removably mounted on said second blade mounting structure;
   said lever being constructed and arranged to be pivotally moved between (a) a blade tensioning position wherein said first and second blade mounting structures are moved relative to one another so as to tension said blade between said first and second blade mounting structures and thereby apply a generally forwardly directed force to said lever via said second blade mounting structure and a rearwardly directed force to the forward end portion of said frame member via said first blade mounting structure and wherein said load transmitting surface engages said load bearing surface so that at least a portion of said generally forwardly directed load is transmitted to and borne by said load bearing surface, thereby preventing the entire forwardly directed force from being transmitted to and borne by said tensioning device mounting structure and (b) a blade releasing position wherein said first and second blade mounting structures are moved relative to one another so as to release the tension from said blade and thereby allow removal and replacement of said blade,
   said lever including an adjusting mechanism constructed and arranged to selectively move said second blade mounting structure relative to said lever so as to selectively adjust the amount of tension being applied to said blade when said lever is in the blade tensioning position thereof,
   said second blade mounting structure having an internally threaded bore and said adjusting mechanism including a threaded member received in threaded engagement within said threaded bore so that relative movement between said second blade mounting structure and said lever can be affected by turning said threaded member.

2. A hacksaw comprising:
   an elongated blade having opposing longitudinal end portions with a cutting edge between said longitudinal end portions;
   a handle and frame assembly comprising:
   (i) a rigid frame member having a forward end portion providing a first blade mounting structure, one of said longitudinal end portions of said blade being removably mounted on said first blade mounting structure;
   (ii) a manually engageable handle member connected rearwardly of said rigid frame member and being constructed and arranged to be manually grasped to enable performance of a cutting operation wherein the cutting edge of the blade is engaged with a workpiece and moved forwardly and rearwardly to cut the workpiece;
   (iii) a generally rearwardly facing load bearing surface having an arcuate, concave configuration; and
   (iv) tensioning device mounting structure spaced generally forwardly of said load bearing surface;

a lever pivotally mounted to said mounting structure, said lever providing a second blade mounting structure and a load transmitting surface having an arcuate, convex configuration that is engageable with said generally rearwardly facing load bearing surface, the other of said longitudinal end portions of said blade being removably mounted on said second blade mounting structure;

said lever being constructed and arranged to be pivotally moved between (a) a blade tensioning position wherein said first and second blade mounting structures are moved relative to one another so as to tension said blade between said first and second blade mounting structures and thereby apply a generally forwardly directed force to said lever via said second blade mounting structure and a rearwardly directed force to the forward end portion of said frame member via said first blade mounting structure and wherein said load transmitting surface engages said load bearing surface so that at least a portion of said generally forwardly directed load is transmitted to and borne by said load bearing surface, thereby preventing the entire forwardly directed force from being transmitted to and borne by said tensioning device mounting structure and (b) a blade releasing position wherein said first and second blade mounting structures are moved relative to one another so as to release the tension from said blade and thereby allow removal and replacement of said blade, wherein said lever has a pair of pivot pins and wherein said tensioning device mounting structure has a pair of apertures formed in a pair of spaced apart side walls on said handle member;

said lever being pivotally connected to said tensioning device mounting structure by inserting said pivot pins into said apertures.

3. A hacksaw comprising:

an elongated blade having opposing longitudinal end portions with a cutting edge between said longitudinal end portions;

a handle and frame assembly comprising:
(i) a rigid frame member having a forward end portion providing a first blade mounting structure one of said longitudinal end portions of said blade being removably mounted on said first blade mounting structure;
(ii) a manually engageable handle member connected rearwardly of said rigid frame member and being constructed and arranged to be manually grasped to enable performance of a cutting operation wherein the cutting edge of the blade is engaged with a workpiece and moved forwardly and rearwardly to cut the workpiece;
(iii) a generally rearwardly facing load bearing surface having an arcuate, concave configuration; and
(iv) tensioning device mounting structure spaced generally forwardly of said load bearing surface;

a lever pivotally mounted to said mounting structure, said lever providing a second blade mounting structure and a load transmitting surface having an arcuate, convex configuration that is engageable with said generally rearwardly facing load bearing surface, the other of said longitudinal end portions of said blade being removably mounted on said second blade mounting structure;

said lever being constructed and arranged to be pivotally moved between (a) a blade tensioning position wherein said first and second blade mounting structures are moved relative to one another so as to tension said blade between said first and second blade mounting structures and thereby apply a generally forwardly directed force to said lever via said second blade mounting structure and a rearwardly directed force to the forward end portion of said frame member via said first blade mounting structure and wherein said load transmitting surface engages said load bearing surface so that at least a portion of said generally forwardly directed load is transmitted to and borne by said load bearing surface, thereby preventing the entire forwardly directed force from being transmitted to and borne by said tensioning device mounting structure and (b) a blade releasing position wherein said first and second blade mounting structures are moved relative to one another so as to release the tension from said blade and thereby allow removal and replacement of said blade, wherein said lever includes an adjusting mechanism constructed and arranged to selectively move said second blade mounting structure relative to said lever so as to selectively adjust the amount of tension being applied to said blade when said lever is in the blade tensioning position thereof.

4. A hacksaw comprising:

an elongated blade having opposing longitudinal end portions and a cutting edge between said longitudinal end portions;

an overmolded frame assembly comprising a rigid metal frame member having a longitudinal portion thereof covered in surrounding relation by solidified plastic material, said solidified plastic material having an I-beam configuration with upper and lower end caps on opposing sides thereof extending longitudinally with respect to said frame member and a generally vertical web extending between said upper and lower end caps;

a first blade mounting structure carried by said hacksaw, one of said longitudinal end portions of said blade being removably mounted on said first blade mounting structure;

a releasable blade tensioning device carried by said hacksaw, said blade tensioning device providing a second blade mounting structure and the other of said longitudinal end portions of said blade being removably mounted on said second blade mounting structure, said blade tensioning device being constructed and arranged to affect relative movement between said first and second blade mounting structures to tension said blade in the longitudinal direction thereof and thereby apply a rearwardly directed force to a forward end portion of said metal frame member, said blade tensioning device being constructed and arranged to affect relative movement between said first and second blade mounting structures to release the tension and allow for removal and replacement of said blade;

said frame assembly being constructed and arranged such that the rearwardly directed force applied to the forward end portion of said frame member creates a bending moment in said frame assembly which said metal frame member and saidsolidified plastic material with the I-beam configuration cooperate to resist; and a manually engageable handle member constructed and arranged to be manually grasped to enable performance of a cutting operation wherein the cutting edge of the tensioned blade is engaged with a workpiece and moved forwardly and rearwardly to cut the workpiece.

5. A hacksaw according to claim 4, wherein said handle member is molded from said solidified plastic material so as to be integral with said frame assembly to thereby define an overmolded handle and frame assembly.

6. A hacksaw according to claim 5, wherein said first blade mounting structure is provided on the forward end portion of said frame member and wherein said tensioning device is movably mounted to said handle and frame assembly generally rearwardly of said first blade mounting structure.

7. A hacksaw according to claim 5, wherein said handle and frame assembly provides a generally rearwardly facing load bearing surface and wherein said tensioning device provides a load transmitting surface that is engageable with said load bearing surface, and wherein said hacksaw further comprises mounting structure spaced apart from said load bearing surface constructed and arranged to movably mount said blade tensioning device to said handle and frame assembly;

said tensioning device being constructed and arranged to be moved between (1) a blade tensioning position wherein said first and second blade mounting structures are moved relative to one another so as to tension said blade and thereby apply a generally forwardly directed force to said blade tensioning device and a rearwardly directed force to the forward end portion of said frame member and wherein said load transmitting surface engages said load bearing surface so that at least a portion of the generally forwardly directed force applied to said tensioning device is transmitted to and borne by said load bearing surface, thereby preventing the entire forwardly directed force from being borne by said mounting structure and (2) a blade releasing position wherein said first and second blade mounting structures are moved relative to one another so as to release the tension from said blade and thereby allow removal and replacement of said blade.

8. A hacksaw according to claim 7, wherein said load bearing surface has an arcuate, convex configuration and wherein said load transmitting surface has an arcuate, concave configuration.

9. A hacksaw according to claim 8, wherein said load bearing surface is spaced generally rearwardly from said mounting structure.

10. A hacksaw according to claim 9, wherein said blade tensioning device includes a lever pivotally mounted on said handle and frame assembly for pivotal movement between said blade tensioning and releasing positions and wherein said mounting structure comprises pivot pins carried by said lever for pivotally mounting said lever.

11. A hacksaw according to claim 10, wherein handle and frame assembly comprises a pair of transversely spaced side walls each having an aperture formed therethrough and wherein the pivot pins carried by said lever are received within said apertures to pivotally mount said lever.

12. A hacksaw according to claim 10, wherein said tensioning device includes an adjusting mechanism that is constructed and arranged to selectively move said second blade mounting structure relative to said lever so as to selectively adjust the amount of tension being applied to said blade when said tensioning device is in the blade tensioning position thereof.

13. A hacksaw according to claim 12, wherein second blade mounting structure has a threaded bore and wherein said adjusting mechanism includes a threaded member received in threaded engagement within said threaded bore so that relative movement between said second blade mounting structure and said lever can be affected by turning said threaded member.

14. A hacksaw according to claim 4, wherein said first and second blade mounting structures each include a post and wherein said longitudinal end portions of said blade each have an aperture formed therethrough, said blade being removably mounted to said blade mounting structures with said posts being inserted through said apertures.

15. A hacksaw according to claim 4, wherein said first blade mounting structure is provided on the forward end portion of said frame member and wherein said tensioning device is movably mounted to said handle member.

16. A hacksaw according to claim 4, wherein said handle member has an opening formed therethrough and through which a user can insert his fingers when manually grasping said handle member.

17. A hacksaw according to claim 4, wherein said metal frame member extends through said generally vertical web with opposed upper and lower longitudinal edge portions of said frame member extending into and being embedded in said upper and lower end caps, respectively.

18. A hacksaw according to claim 4, wherein said frame member has a curved shape.

19. A method for making a hacksaw, comprising:

providing a rigid metal frame member;

molding and solidifying molten plastic material in surrounding relation over a longitudinal portion of said frame member so as to provide said plastic material with an I-beam configuration having upper and lower end caps on opposing sides thereof extending longitudinally with respect to said frame member and a generally vertical web extending therebetween;

connecting a manually engageable handle member rearwardly of said metal frame member either before or after overmolding and solidifying said plastic material such that said metal frame member, said plastic material, and said handle member define a handle and frame assembly, said handle and frame assembly providing a first blade mounting structure;

mounting a blade tensioning device to said handle and frame assembly, said blade tensioning device providing a second blade mounting structure;

removably mounting opposing longitudinal end portions of an elongated blade to said first and second mounting structures, said blade having a cutting edge between said longitudinal end portions; and thereafter operating said tensioning device so as to affect relative movement between said first and second blade mounting structures and thereby tension said blade between said first and second blade mounting structures such that said blade applies a rearwardly directed force to a forward end portion of said metal frame member so as to create a bending moment in both said metal frame member and said solidified plastic material with the I-beam configuration, said frame member and said plastic material cooperating to resist the bending movement create by said rearwardly directed force.

20. A method according to claim 19, wherein said handle member is connected to said frame member before overmolding said molten plastic material and wherein overmolding said plastic material over said frame member further includes molding said molten plastic over said handle member so as to define an overmolded handle and frame assembly.

21. A method according to claim 19, wherein said first blade mounting structure is provided on the forward end portion of said frame member and wherein said tensioning device is movably mounted to said handle member.

22. A method according to claim 19, wherein said handle member has an opening formed therethrough through which a user can insert his fingers when manually grasping said handle member.

23. A method according to claim 19, wherein said metal frame member extends through said generally vertical web with opposed upper and lower longitudinal edge portions of said frame member extending into and being embedded in said upper and lower end caps, respectively.

24. A method according to claim 19, wherein said frame member has a curved shape.

25. A method according to claim 19, wherein said molten plastic material is molded and solidified by:
provided an injection molding die assembly having interior surfaces that cooperate to define a molding cavity;
disposing said metal frame member in said molding cavity;
injecting said molten plastic material into said molding cavity such that said plastic material surrounds said longitudinal portion of said frame member and said molding cavity provides said plastic material with the aforesaid I-beam configuration;
thereafter solidifying said molten plastic material; and
then removing said frame member with said solidified plastic material thereon from said molding cavity.

26. A method according to claim 25, wherein said injection molding die assembly comprises a pair of die halves each providing said interior surfaces that cooperate to define said molding cavity.

27. A method according to claim 19, wherein said frame member is formed by:
disposing a sheet metal blank in a stamping die assembly;
engaging a stamping die with said blank so as to separate a plurality of frame members with opposing first and second longitudinally extending edges from said blank in such a manner that (1) the first edge of each frame member is sheared from and substantially congruent with the second edge of a frame member which is immediately adjacent said first edge and (2) the second edge of each frame member is sheared from and substantially congruent with the first edge of a frame member which is immediately adjacent said second edge; and
then selecting said frame member from said plurality of frame members.

28. A method according to claim 27, wherein said stamping die provides said first and second edges of each frame member with arcuate shapes.

29. A method according to claim 28, wherein the arcuate shape of said first edge of each frame member is defined along a portion of a first imaginary circle and wherein said second edge of each frame member is defined along a portion of a second imaginary circle, said first and second imaginary circles having equal radii and spaced apart centerpoints.

30. A method according to claim 29, wherein said handle member is connected to said frame member by driving rivets through said handle member and said frame member.

31. A method according to claim 27, wherein said stamping die assembly comprises a fixed support structure for supporting said blank during the stamping thereof and a hydraulic press ram constructed and arranged to move said stamping die in a reciprocating manner through a stamping cycle wherein said die stamps said blank as aforesaid.

32. A method according to claim 27, wherein said plurality of frame members are each stamped individually from said blank.

33. A method for making a hacksaw, comprising:
feeding a sheet metal blank into a cutting tool assembly;
engaging a cutting tool with said blank so as to separate a plurality of frame members with opposing first and second longitudinally extending edges from said blank in such a manner that (a) the first edge of an associated one of said frame members is sheared from and substantially congruent with the second edge of a frame member that is immediately adjacent the first edge of said associated one of said frame members and (b) the second edge of said associated one of said frame members is sheared from and substantially congruent with the first edge of a frame member that is immediately adjacent the second edge of said associated one of said frame members;
connecting a manually engageable handle member to said associated one of said frame members with said handle member being disposed rearwardly of said associated one of said frame members, one of said handle member and said associated one of said frame members providing a first blade mounting structure;
connecting a releasable blade tensioning device to one of said handle member and said associated one of said frame members either before or after connecting said handle member to said associated one of said frame member, said releasable blade tensioning device providing a second blade mounting structure;
removably mounting opposing longitudinal end portions of an elongated blade to said first and second blade mounting structures; and
thereafter operating said blade tensioning device so as to affect relative movement between said blade mounting structures and thereby tension said blade.

34. A method according to claim 33, wherein said cutting tool assembly is a stamping die assembly and wherein said cutting tool is a stamping die.

35. A method according to claim 34, wherein said stamping die provides said first and second edges of each frame member with arcuate shapes.

36. A method according to claim 35, wherein the arcuate shape of said first edge of each frame member is defined along a portion of a first imaginary circle and wherein said second edge of each frame member is defined along a portion of a second imaginary circle, said first and second imaginary circles having equal radii and spaced apart centerpoints.

37. A method according to claim 34, wherein said handle member is connected to said frame member by fixing rivets through said handle member and said frame member.

38. A method according to claim 34, wherein said stamping die assembly comprises a fixed support structure for supporting said blank during the stamping thereof and a hydraulic press ram constructed and arranged to move said stamping die in a reciprocating manner through a stamping cycle wherein said die stamps said blank as aforesaid.

39. A method according to claim 34, wherein said plurality of frame members are each stamped individually from said blank.

40. A method according to claim 34, further comprising:
molding molten plastic material in surrounding relation over a longitudinal portion of each frame member;
solidifying said molten plastic material so as to provide the plastic material on each frame member with an I beam configuration having upper and lower end caps on opposing sides thereof extending longitudinally with respect to each frame member and a generally vertical web extending therebetween;

connecting a manually engageable handle member rearwardly of each metal frame member either before or after overmolding and solidifying said plastic material.

41. A method according to claim 40, wherein said handle members are connected to said frame members before overmolding said molten plastic material and wherein overmolding said plastic material over said frame members further includes molding said molten plastic material over said handle members so as to define overmolded handle and frame assemblies.

42. A method according to claim 40, wherein said first blade mounting structure is provided on a forward end portion of each frame member and wherein said tensioning devices are movably mounted to said handle members.

43. A method according to claim 40, wherein said handle members each have an opening formed therethrough through which a user can insert his fingers when manually grasping said handle member.

44. A method according to claim 40, wherein each metal frame member extends through the generally vertical web of its associated plastic material with opposed upper and lower longitudinal edge portions of said frame member extending into and being embedded in the associated upper and lower end caps, respectively.

45. A method according to claim 40, wherein each frame member has a curved shape.

46. A method according to claim 40, wherein said molten plastic material is overmolded in surrounding relation over at least a longitudinal portion of each frame member and thereafter solidified by:

providing an injection molding die assembly which has interior surfaces which cooperate to define a molding cavity;

disposing one of said plurality of metal frame members in said molding cavity;

injecting said molten plastic material into said molding cavity such that said plastic material surrounds said at least a longitudinal portion of said one frame member and said molding cavity cooperates to provide said plastic material with the aforesaid I-beam configuration;

thereafter solidifying said molten plastic material; and then removing said one frame member with said solidified plastic material thereon from said molding cavity.

\* \* \* \* \*